United States Patent
Gagnon

(10) Patent No.: US 11,463,284 B1
(45) Date of Patent: Oct. 4, 2022

(54) PROGRAMMABLE CORRELATION COMPUTATION SYSTEM

(71) Applicant: Cadence Design Systems, Inc., San Jose, CA (US)

(72) Inventor: Mathieu Gagnon, Montréal (CA)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 17/305,572

(22) Filed: Jul. 9, 2021

(51) Int. Cl.
*H04L 25/03* (2006.01)

(52) U.S. Cl.
CPC .. *H04L 25/03885* (2013.01); *H04L 25/03267* (2013.01)

(58) Field of Classification Search
CPC ................ H04B 1/16; H04L 25/03254; H04L 25/03267; H04L 25/03273; H04L 25/03885; H04L 2025/03433; H04L 2025/03592; H04L 2025/03611
USPC ....... 375/232, 233, 260, 262, 265, 316, 326, 375/340, 341, 343, 346, 348
See application file for complete search history.

(56) References Cited

U.S. PATENT DOCUMENTS

| | | | |
|---|---|---|---|
| 6,263,418 B1 * | 7/2001 | Boutaud ............. | G06F 9/30058 710/16 |
| 9,385,897 B2 * | 7/2016 | Sindalovsky ..... | H04L 25/03343 |
| 10,404,408 B1 * | 9/2019 | Lin ......................... | H04L 27/01 |
| 11,245,554 B1 * | 2/2022 | Zhang ................... | H03L 7/0891 |
| 2006/0008279 A1 * | 1/2006 | Chiang ............. | H04B 10/6971 398/202 |

FOREIGN PATENT DOCUMENTS

CN 103997378 A * 8/2014 ............. H04L 1/201

* cited by examiner

*Primary Examiner* — Young T. Tse
(74) *Attorney, Agent, or Firm* — Schwegman Lundberg & Woessner, P.A.

(57) ABSTRACT

Various embodiments described herein provide for a receiver device that includes a processor, a non-linear equalizer, an accumulation register, and a plurality of co-processors. Each of the plurality of co-processors is operably coupled to the processor, the non-linear equalizer, and the accumulation register. Each of the plurality of co-processors can be configured to receive a configuration value from the processor, receive a data signal for processing from the non-linear equalizer, process the data signal based on the configuration value, and provide at least a portion of the processed data signal to the processor.

20 Claims, 7 Drawing Sheets

PROGRAMMABLE CORRELATION COMPUTATION SYSTEM

TECHNICAL FIELD

Embodiments described herein relate to data communications, and more particularly, to a programmable correlation computation system for data communication.

BACKGROUND

Conventional high-speed serial communication systems include various components that are used by the receiving device to receive, filter, recover, and correct errors in the data signal from the transmitter. Many serial receiver systems perform decision feedback equalization (DFE) on received data. Such serial receiver systems can include (i) an analog front end that provides some continuous time linear equalization (CLTE), (ii) a sampler, (iii) a DFE that uses the quantized received data to adaptively feedback a correction signal, and (iv) a timing recovery unit.

Microcontrollers are used to process the incoming data at a receiving device for signal recovery. However, in high-speed serial communications, microcontrollers often cannot process the data fast enough to keep up with the incoming data. Accordingly, methods and systems to support bit level processing at high speeds would be beneficial.

BRIEF DESCRIPTION OF THE SEVERAL VIEWS OF THE DRAWINGS

To easily identify the discussion of any element or act, the most significant digit or digits in a reference number refer to the figure number in which that element is first introduced.

DETAILED DESCRIPTION

Figure 1:
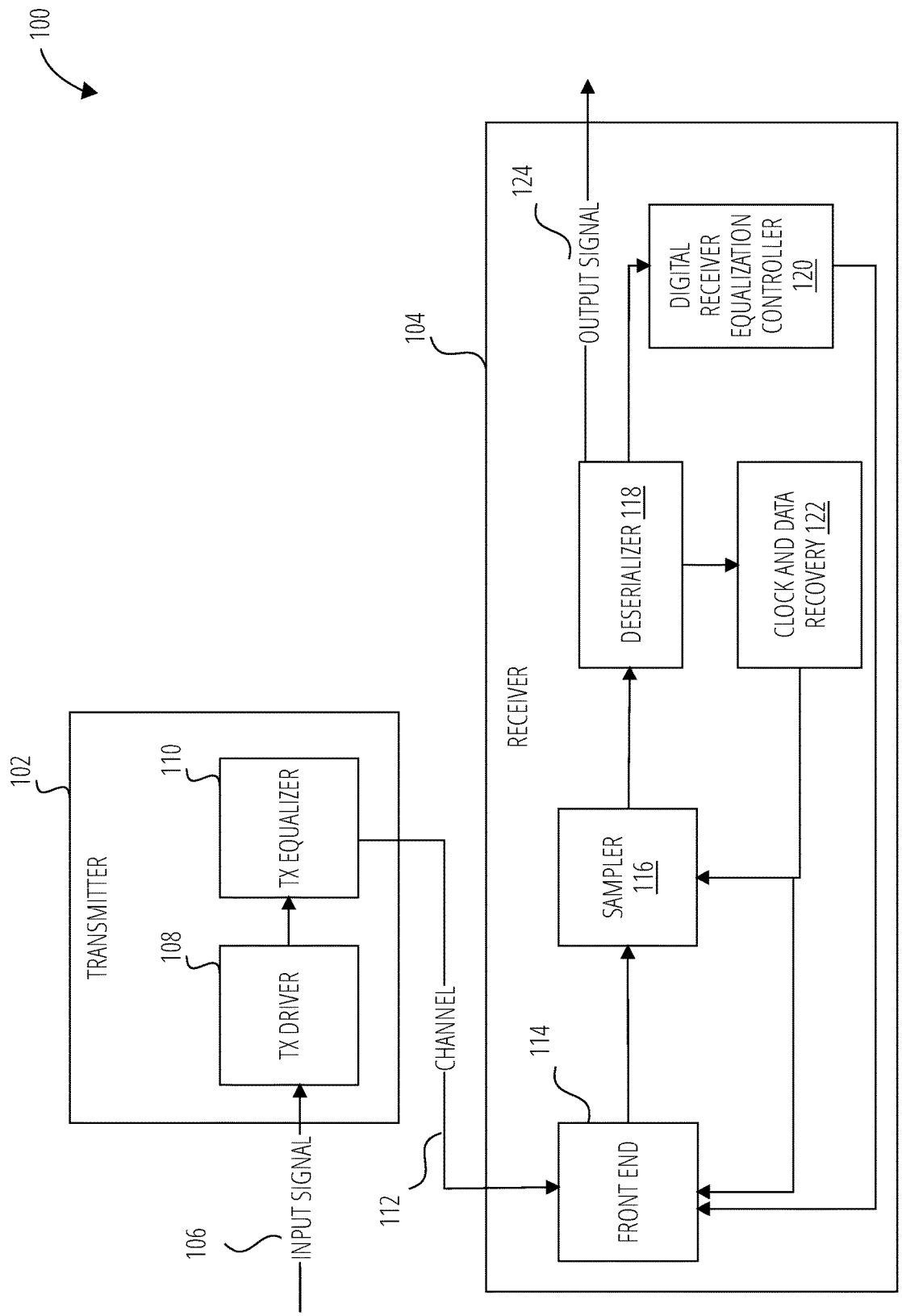
FIG. 1 illustrates a block diagram of a high-speed transmission system in accordance with some embodiments.

Hardware electronic devices are typically composed of semiconductor materials that, due to various manufacturing conditions, can have slight differences in performance. These slight differences in performance add up over a system and can cause distortion of important signals.

In various digital systems, signals can be transmitted from a transmitter to a receiver via a transmission channel. The transmission channel can be any suitable wired or wireless medium which operably couples the transmitter to the receiver. In many instances including high data transmission speeds, the transmission channel becomes lossy. The transmitted signal can become lossy because of interference, attenuation, and delay in the channel, among other factors. Such losses can cause significant detrimental effects on the transmitted signal when it is received by the receiver. Sufficient amplitude and phase distortion of the transmitted signal can result in intersymbol interference (ISI) in the signal received at the receiver. ISI generally refers to the 'smearing' of a pulse or other symbol representing the logic state of one data bit to the degree such that it contributes to the content of one or more of the preceding (e.g., post-cursor ISI) or succeeding (e.g., pre-cursor ISI) data bits.

In high-speed communication devices, data signal integrity is crucial to the performance of the device. To compensate for various manufacturing tolerances and variances injected by the combination of various hardware components within the high-speed communication device, a programmable engine configured to alter the behaviors of specific portions of the communication device is highly desired. As the number of interactions between components within the high-speed communication device is high, there is a limitation on possible hardware solutions. Conventional systems attempt to alleviate the impairments caused by manufacturing differences by implementing a microcontroller to define how certain operations are performed within the communication device.

A major drawback to such conventional systems is that the microcontrollers are limited in their capabilities to process data at a rate fast enough to keep up with high-speed protocols such as peripheral component interconnect express (PCIe). Additionally, such microcontrollers are too slow to perform bit-level processing for accumulation operations, correlation operations, and debugging operations.

According to certain aspects, embodiments provide a method for using one or more correlators to process incoming data signal(s) and provide the processed data for further processing by a main processor. A receiving device including a processor, a non-linear equalizer, an accumulation register, and two or more co-processors are configured to perform operations including receiving a set of configuration values from the processor and receiving a data signal from the non-linear equalizer. The two or more co-processors are configured to process the data signal based on the configuration value from the processor and providing at least a portion of the processed data signal to the processor. In accordance with some embodiments, the two or more co-processors are configured to provide bit-level processing of data and provide the processed data to the processor for various purposes including controlling the analog and/or digital correction factors to equalize the input data signal.

The following description of embodiments provides non-limiting representative examples referencing numerals to describe features and teachings of different aspects of the invention. The embodiments described should be recognized as capable of implementation separately, or in combination with other embodiments from the description of embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

One aspect of the present disclosure is to provide systems and methods for coordinating bit-level processing within a controller of a receiver device.

According to an embodiment, a system for coordinating bit-level processing includes a processor, an equalizer (e.g., non-linear equalizer), an accumulation register, and two or more co-processors. Each of the two or more co-processors is configured to provide bit level-processing functionalities and to submit the results of the bit level-processes to the processor. Each of the two or more co-processors can receive a configuration value from the processor, receive a data signal for processing from the equalizer, process the data signal based on the configuration value, and provide the processed data to the processor.

According to some embodiments, a non-transitory computer-readable medium on which are stored instructions that are executable by a processor and that, when executed by the processor, cause the processor to perform a method for coordinating bit level processing within a controller of a receiver device, wherein the method includes: receiving, at a first co-processor of a plurality of co-processors, a configuration value from a processor, receiving a data signal for processing from a non-linear equalizer, processing the data signal based upon the configuration value including performing bit-level processing of the data signal and providing at least a portion of the processed data signal to the processor.

According to some embodiments, a method for coordinating bit-level processing includes, at a receiver device, receiving, at a first co-processor of a plurality of co-processors, a configuration value, and a data signal for processing the data signal in accordance with the configuration value, and providing the processed data signal to a processor.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

FIG. 1 is a block diagram of a communication system in accordance with some embodiments. The system 100 can include a transmitter 102, a receiver 104, and at least one channel 112 connecting the transmitter 102 to the receiver 104. In some embodiments, the transmitter 102 and the receiver 104 can be implemented in one or more integrated circuits (ICs). The channel 112 can be unidirectional or bidirectional and can transmit data using a positive and negative polarity data signal. A single-ended implementation is also possible.

The transmitter 102 receives an input signal 106 to be transmitted and transmits a representation of the input signal 106 using a transmission (TX) driver 108. The system 100 can be a serial communication system, in which the input signal 106 can be serialized before or after being input to the transmitter 102. The TX driver 108 can form a differential signal based on the input signal 106. The differential signal can have a specified amplitude, the value of which can vary depending on the communication standard by which the transmitter 102 communicates with the receiver 104.

The transmitter 102 can include a TX equalizer 110, which can be implemented using a feed-forward equalizer (FFE) having adjustable tap weights. In some embodiments, the TX equalizer 110 and Tx driver 108 are combined into a single circuit block.

The input to receiver 104 can be processed through a front end 114, which can include a linear and/or non-linear equalizer with programmable gain and/or frequency shaping, a sampler 116, and a deserializer 118.

The front end 114 can also receive outputs from a digital receiver equalization controller 120 and a sampler 116. Specifically, the front end 114 sums the weighted and delayed outputs from the sampler 116 to the received signal. The weight values are determined by the digital receiver equalization control (e.g., a decision feedback equalizer (DFE)). In an embodiment, the sampler 116 samples and quantizes the received signal to generate in-phase (I) and quadrature (Q) samples over a series of predetermined unit intervals (UI), with each Q sample being disposed between consecutive I samples. Further, the sampler 116 samples the received signal based on a plurality of clock signals output from the clock and data recovery unit. In an embodiment, the sampler 116 sends the sampled data to the front end 114 and deserializer 118.

The deserializer 118 deserializes the quantized data and provides the deserialized data to the digital receiver equalization controller 120 and the clock and data recovery unit 122 and in some embodiments, provides the deserialized data as an output signal 124. In some embodiments, the deserializer 118 samples the quantized data at the edge of the I sample and the center of the I sample. In some embodiments, the deserialized data received by the digital receiver equalization controller 120 is deserialized at a value different than the deserialized data received by the clock and data recovery unit 122.

In some embodiments, the digital receiver equalization controller 120 carries out predetermined control processing for the equalization utilized by the receiver 104 based on data received from the deserializer 118 and feeds back various equalization information to the front end 114 to perform the corrective operation. For example, the digital receiver equalization controller 120 sends the DFE weights, the VGA gain, and the CTLE settings to the front end 114. As a feedback equalizer, the sampler 116 generally makes a logic 1 or 0 decision on the sample data. The decision is scaled and delayed and then fed back to the front end 114 where it is added back into the received data. Therefore, the DFE establishes a feedback loop where the decision is made in that loop.

The clock and data recovery 122 receives the I and Q data samples from the deserializer 118 and based on the I and Q data, determines if the sampler 116 is running too slow or too fast. To correct the late or early clock rate of the sampler 116, the clock and data recovery 122 generates a plurality of clocks to provide to the sampler 116.

A clock and data recovery 122 can include a phase detector, a loop filter, and a phase interpolator in accordance with some embodiments. The phase detector can be configured to receive a plurality of deserialized data samples from the deserializer 118. For example, the deserializer 118 transmits deserialized I, Q, Qp, and Qm data samples to the phase detector. In some embodiments, the Qp data samples correspond to Q data samples shifted in the positive direction by a value associated with one of the previously discussed DFE weights (e.g., coefficients). Similarly, the Qm data samples correspond to Q data samples shifted in the negative direction by a value associated with the DFE coefficient. Based on the received data samples (i.e., I, Q, Qp, and Qm), the phase detector will generate one of an early, late, or no update signal. For example, to represent an early signal, the phase detector can generate a value of "01" to represent a late signal, the phase detector can generate a value of "10", and to represent that no update is needed, the phase detector can generate a value of "00." In some embodiments, the phase detector performs the early/late analysis for each of then numbers of deserialized samples of the I, Q, Qp, and Qm data samples.

Accordingly, the phase detector will provide n early/late signals to the loop filter for processing where the loop filter determines if, over a certain period of time, the received early/late signals include a majority of early signals or a majority of late signals. Based on this determination, the loop filter generates one of an early or late signal to transmit to the phase interpolator. The loop filter in some embodiments can add the early/late signals over the period of time and based on the sign of the sum and generate one of an increment or decrement signal. For example, an early signal is associated with a "+1" and a late signal is associated with a "−1," and the signals requiring no updates are associated with "0". If the sum of all of the early/late signals is associated with a positive sign, or a value greater than 0, it is assumed that the majority of the early/late signals were early signals. Similarly, if the sum of all of the early/late signals is associated with a negative sign or a value less than 0, it can be assumed the majority of the signals were late signals. This early/late signal is filtered digitally. In some embodiments, the phase interpolator modifies the phase of the plurality of clocks being provided to the sampler 116 based on the received early or late signal. For example, if the loop filter transmits an early signal, the phase interpolator decrements the phase of the plurality of clocks. In some embodiments, decreasing the phase implies that the phase of the sampler clock is shifted earlier in time. Similarly, if the loop filter transmits a late signal, the phase interpolator increments the phase of the plurality of clocks and the phase of the sampler clock is shifted later in time. In some embodiments, after modifying the clocks, the phase interpolator provides the modified clocks to the sampler 116.

Figure 2:
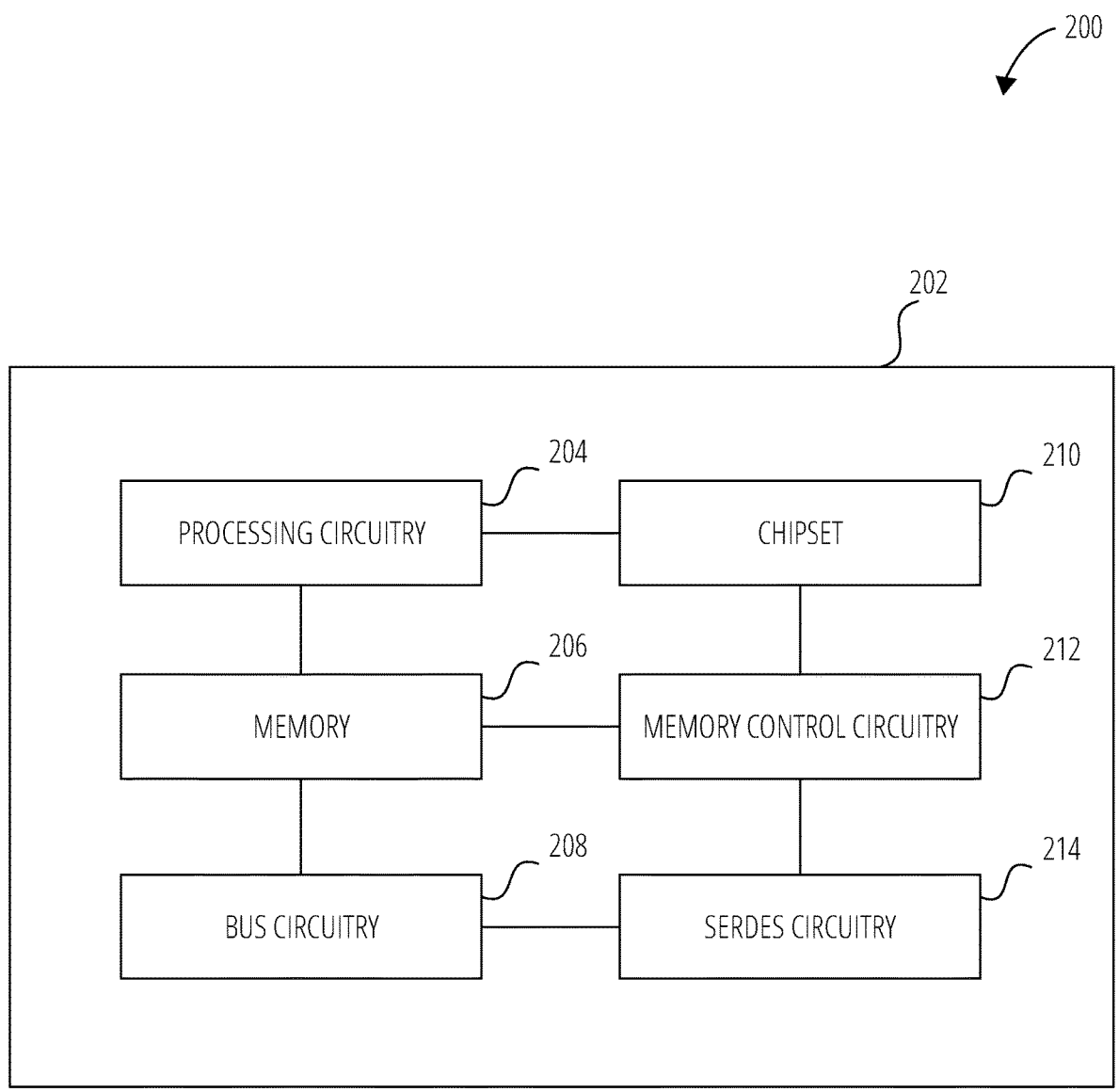
FIG. 2 illustrates a block diagram of an integrated circuit (IC) in accordance with some embodiments.

FIG. 2 is a block diagram 200 of an example integrated circuit (IC) 202 in accordance with some embodiments. The term "integrated circuit" as used herein can refer to a semiconductor device and/or microelectronic device, such as, for example, but not limited to, a semiconductor integrated circuit chip. The specific configuration, arrangement, and components shown in IC 202 are provided merely for exemplary purposes as additional and/or alternative configurations are also within the scope of the present disclosure.

In some embodiments, the IC 202 can include core processing circuitry 204, which can include one or more of any suitable processors. The IC 202 can also include chipset 210. In some embodiments, the chipset 210 can include both Northbridge/memory controller hub (MCH) and Southbridge I/O controller hub (ICH) circuitry. These components can be included within the chipset 210 or at any other location within the IC 202.

The IC 202 can also include memory 206, which can be in communication with core processing circuitry 204. Memory 206 can comprise one or more of the following types of memories: semiconductor firmware memory, programmable memory, non-volatile memory, random access memory, flash memory (including NAND and/or NOR type memory architectures), magnetic disk memory, and/or optical disk memory. Either additionally or alternatively, memory 206 can comprise other and/or future developed types of computer-readable memory.

IC 202 can additionally include memory control circuitry 212 configured to provide compatibility with a variety of different bus circuitry 208, including, but not limited to, Universal Serial Bus (USB), Serial Advanced Technology Attachment (SATA), Peripheral Component Interface (PCI), PCI-Express, and System Management Bus (SMBus). The IC 202 can also include SerDes circuitry 214, which can include numerous components configured to transmit/receive one or more high-speed data signals.

Figure 3:
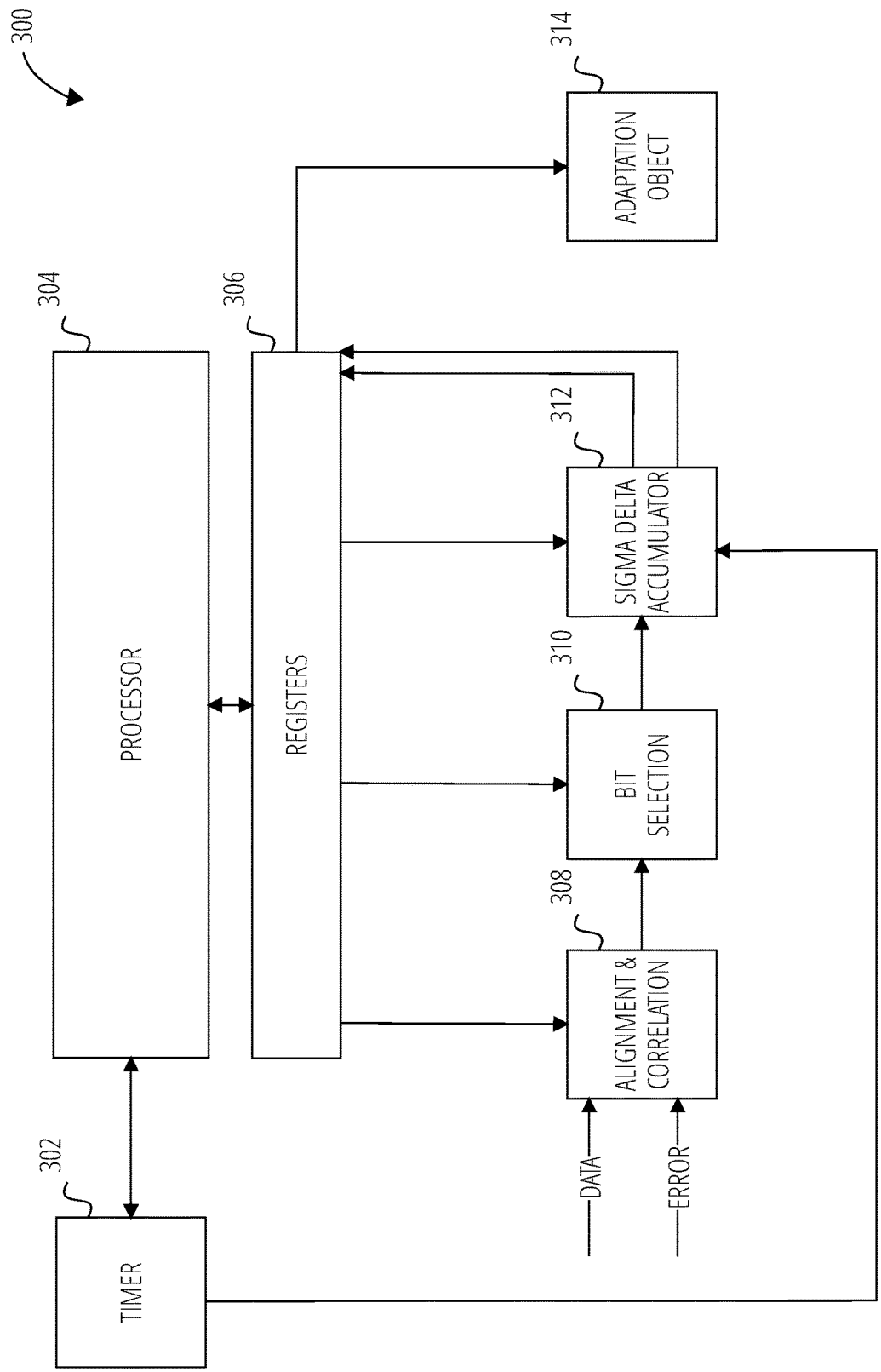
FIG. 3 illustrates a block diagram of a processor for coordinating bit-level processing of data in accordance with some embodiments.

FIG. 3 illustrates a block diagram of a digital receiver equalization processor in accordance with some embodiments.

System 300 includes a timer 302, a processor 304, registers 306, and various correlators including alignment & correlation 308, bit selection 310, and sigma delta accumulator 312. The processor 304 is configured to receive a timing signal from timer 302. The processor 304 is configured to perform various tasks such as adaptation sequencing, co-processor configuration, co-processor result servicing, among other various lane/protocol management task. The processor 304 also is configured to associate various objects into a single actuator (e.g., DFE tap 1, offsets, scaling factors). Registers 306 can be programmable registers having variable values or hard-wired connections.

The alignment & correlation 308 block receives a data and an error signal from an external source (e.g., DFE) and can also receive configuration instructions from processor 304. The alignment & correlation 308 block can correlate an error sample with a data sample and perform one or more operations (e.g., least mean squares algorithm) to output a signal. The signal represents a correlation between the current error sample and one or more pre-cursor or post-cursor bits. The generated output signal from the alignment & correlation 308 block is sent to the bit selection 310 block.

The bit selection 310 block is configured to select a number of correlation results to be provided to the accumulator 312. In some embodiments, the bit selection 310 block can receive a greater number (e.g., 16-20) of deserialized bits (e.g., from alignment & correlation 308) and of the greater number of deserialized bits, select a subset (e.g., 4 bits). Bit selection 310 block can also receive filter configurations that select correlation results for specific input patterns from the processor 304. After the bit selection 310 block processes the received data, the data is passed to a low-pass filtering sigma delta accumulator 312 block.

The sigma delta accumulator 312 can also receive configuration instructions from processor 304. In some embodiments, the sigma delta accumulator 312 sums the correlation results from alignment & correlation 308 block and outputs the result of the summation as a trend value. The sigma delta accumulator 312 can accumulate a sign of the correlation results and output an accumulated sign as a result of the accumulation. For instance, when the number of positive correlation results is greater than the number of negative correlation results, the accumulator 312 can output a positive value (e.g., a positive difference between two numbers) or output a negative value (e.g., a negative difference between two numbers) and when the two numbers are the same, the accumulator 312 can output "0." In some embodiments, the sigma delta accumulator 312 receives a timing signal from timer 302 in order to start the accumulation with the count from the processor 304, and to stop accumulating when the pre-determined count is reached.

If it is determined that the trend value is greater or lower than the predetermined target trend value, the sigma delta accumulator 312 can output an increment signal instructing the processor 304 to increase or decrease the adapted object value (e.g., a DFE tap 1 value). The output of the sigma delta accumulator 312 provides a decrement and increment value to be stored at the registers 306 and can be provided to adaptation object 314 (e.g., analog actuators) for implementations.

Each of the alignment & correlation 308, bit selection 310, and sigma delta accumulator 312 blocks are components of a "correlator". Each correlator can include various other modules including a compressor, an accumulator, interrupt generators, and others. The processor 304 is configured to control various functionalities of each correlator.

Figure 4:
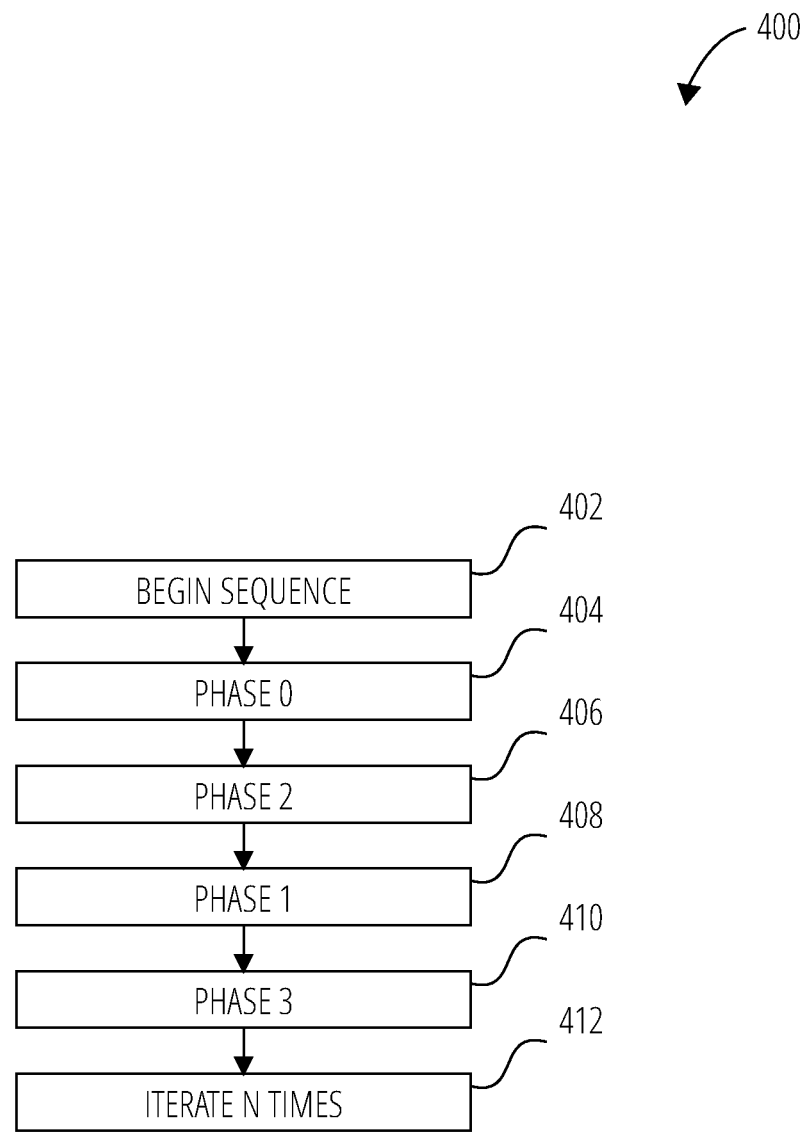
FIG. 4 is a flowchart of an example sequence performed by a co-processor for coordinating bit-level processing of data in accordance with some embodiments.

FIG. 4 is a flow diagram illustrating an example sequence of operations for coordinating bit-level processing in accordance with some embodiments.

Operation 402 begins the method 400 for a sequence of steps performed by a co-processor.

At operation 404, the co-processor can set and/or read SD accumulator (e.g., sigma delta accumulator 312) for phase 0 of a data signal received at a sampler for phase 0 of a data signal. For example, in a quarter rate sampling system, a signal is sampled in sequence over four discrete phases (e.g., phase 0, 1, 2, and 3).

In some embodiments, when the sampler (e.g., an edge sampler) for phase 0 is enabled, an initial polarity is selected. An edge level is set, and an edge threshold is computed. One or more operations for adaptation is performed and the polarity selection can be toggled. The operations can be configured to loop over polarities, store and reset the accumulator, toggle the filter, loop over single samplers, store and reset the accumulator if necessary, and de-select the current edge sampler phase after a specified number of loops have been completed. In some embodiments, each of operations 404, 406, 408, 410, and 412 include the steps described above with respect to operation 404 for each phase. In some embodiments, the sampler is an error sampler and/or a data sampler.

At operation 406, the co-processor can set and/or read SD accumulator for phase 2 of the data signal received at a sampler for phase 2 of the data signal. After operation 406, the co-processor can set and/or read the SD accumulator.

At operation 408, the co-processor can set and/or read SD accumulator for phase 1 of the data signal received at a sampler for phase 1 of the data signal, and at operation 410, the co-processor can set and/or read SD accumulator for phase 3 of the data signal. After operation 410, the co-processor can set and/or read the SD accumulator. The method 400a including operations 402-412 can be repeated or iterated as configured by a main processor (e.g., processor 304).

For some modes of operation, the SD accumulator can maintain a count for all phases (e.g., phase 0, 1, 2, and 3). In another embodiment, a separate mode of operation can include the SD maintaining distinct counts for phases 0 and 2 and another for phases 1 and 3. In another embodiment, a separate mode of operation can include the SD accumulator configured to treat each phase as being independent. The various modes of operation provide the flexibility of being able to provide an average adjustment based upon the average from all four phases, from groups of two distinct phases, and from each individual phase.

Figure 5:
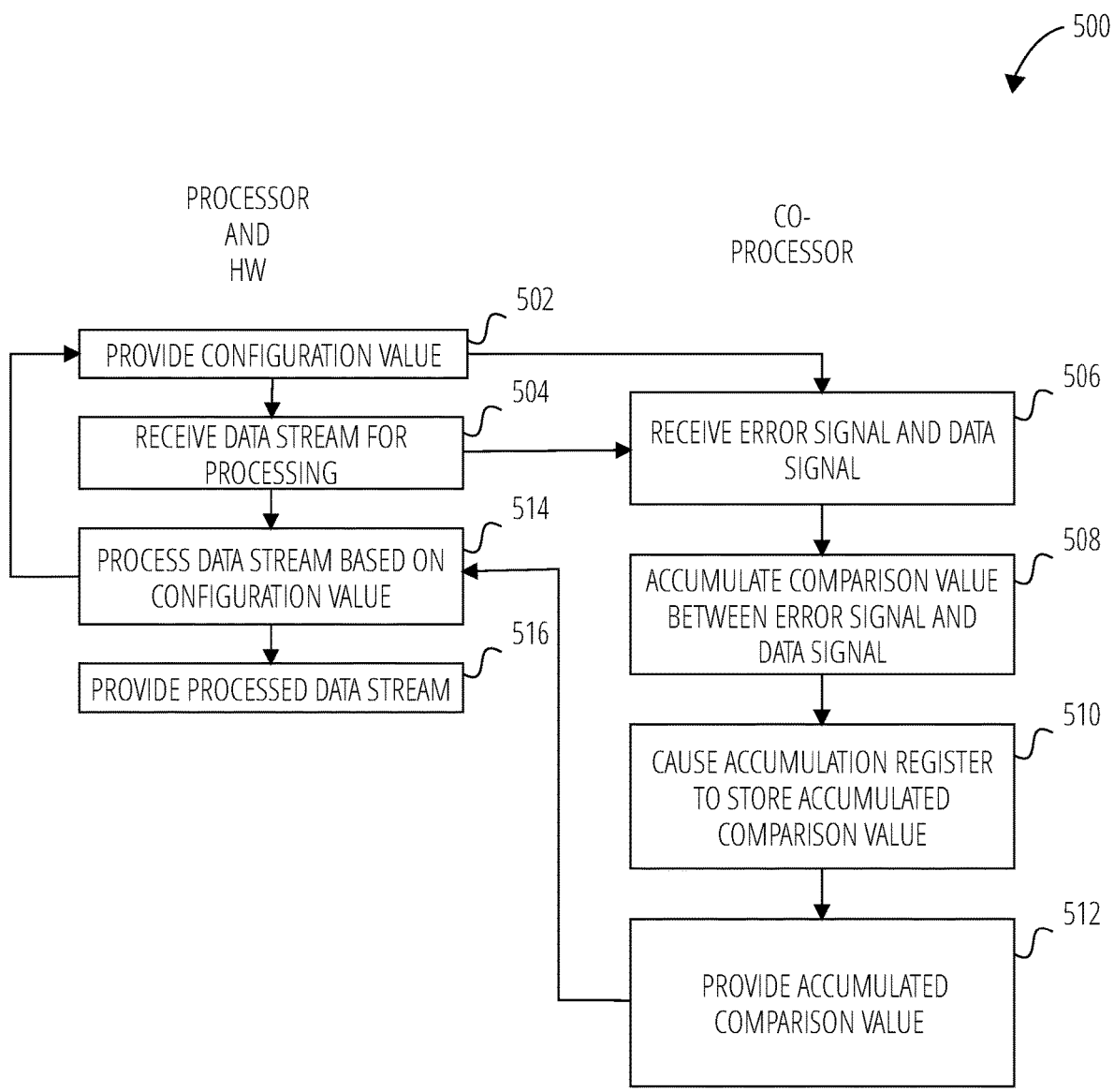
FIG. 5 is a flowchart illustrating an example methodology of coordinating bit-level processing of data in accordance with some embodiments.

FIG. 5 illustrates a method for coordinating bit-level processing in accordance with some embodiments.

In this example, method 500 begins at operation 502 wherein a processing circuit (e.g., processor 304) provides a configuration value to a first co-processor of a plurality of co-processors. At operation 504, the first co-processor receives a data signal for processing. The data signal in some embodiments is received from a non-linear equalizer (e.g., decision feedback equalizer).

In some embodiments, the co-processor is configured to select data to be accumulated based upon a level of a current bit. For example, error data received by the co-processor is valid when the current bit is 0 or 1. The error is computed as a sign of the difference between the actual signal and the expected signal. The expected signal is either at a positive voltage when the current bit is 1 and a negative voltage when the current bit is 0. In some embodiments, the error is computed using a comparator to compute the sign of the difference between the actual and expected signal. The output of the comparator is valid when the current bit is +1 or 0 according to an expected signal currently programmed in the error sampler.

In some embodiments, the co-processor is configured to process the received data through one or more programmable filters to generate filtered data. The co-processor selects the data to be accumulated based on the filtered data. In some embodiments, the accumulated and filtered data is read by the processor for further use or compared with a threshold value. When the filtered data exceeds the threshold in a positive manner, the co-processor generates an increment signal and likewise when the filtered data exceeds the threshold in a negative manner, the co-processor generates a decrement signal. The accumulator accumulates the signals and when the signals have reached a large trend, the accumulator sends the processor a signal indicating the trend. Similarly, the filtered data is accumulated to obtain a positive and/or negative overflow signal to be provided to the processor.

In some embodiments, the co-processor is configured to automatically cease accumulating data from the data signal in the accumulation register in accordance with a generation of an overflow signal. The overflow signal is sent to the processor to indicate the co-processor cannot continue processing data. After the processor has retrieved the necessary data from the co-processor, the co-processor can receive a startup signal from the processor indicating the co-processor is to resume accumulating data from the data signal.

At operation 506, the co-processor receives an error signal and a data signal. The co-processor uses the received error signal and the data signal to calculate a comparison value between the error signal and the data signal, accumulates the comparison value at operation 508, and stores the value (operation 510), in an accumulator (e.g., sigma delta accumulator 312).

In some embodiments, the co-processor accumulates a number of bits received in the data signal and stores the number of bits in the accumulation register. In some embodiments the processor reads the stored number of bits and uses the data to compute a correction factor for applying to the signal. The co-processor at operation 512 causes the accumulation register to provide the accumulated comparison value for further processing (e.g., by processor 304).

Based on the received data signal, the co-processor is configured to perform bit-level processing to provide the output signal to a main processor (e.g., processor 304).

As shown with regards to operation 514, the co-processor can perform one or more processing operations on the data signal based on the received configuration value. As each of the co-processors of the plurality of co-processors can essentially be composed of identical components having identical capabilities, configuration values from the processor (e.g., processor 304) are used to identify specific tasks for the co-processor to perform. The processor is further configured to identify and distribute configuration values to each of the co-processors that are being utilized.

In some embodiments, at operation 514, an updated configuration value is calculated and provided as a feedback loop to block 502. The processor at operation 516 provides and/or utilizes the processed data signal at operation 516 for various tasks including debugging. In some embodiments, the processed data signal is provided to the main processor (e.g., processor 304) and in some embodiments, the processed data signal is provided as the high-speed data to a higher communication protocol layer. The main processor can then use the information received from the first co-processor to control the analog and/or digital correction factors to equalize the input data signal.

Figure 6:
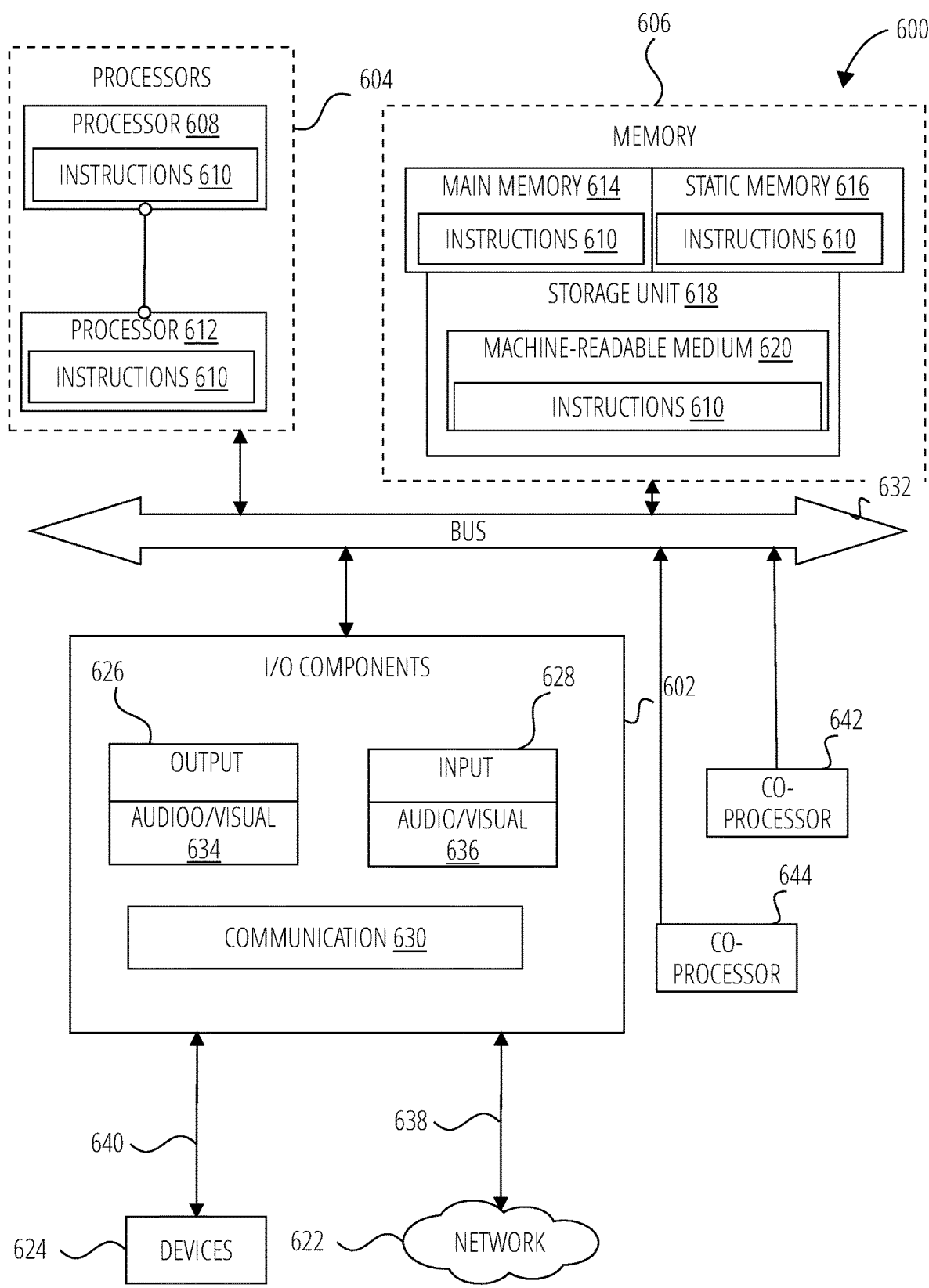
FIG. 6 is a block diagram of an example system in accordance with some embodiments.

FIG. 6 is a block diagram illustrating components of a device 600 according to some embodiments, able to read instructions 610 from a machine-readable medium (e.g., machine-readable storage medium or machine-readable storage device) and perform any one or more of the methodologies discussed herein. The instructions 610 can cause the device 600 to execute the method illustrated in FIGS. 4A, 4B, and/or 5. Additionally, or alternatively, the instructions 610 can implement one or more of the components of FIG. 1-3. The instructions 610 transform the general, non-programmed device 600 into a particular device 600 programmed to carry out the described and illustrated functions in the manner described. In alternative embodiments, the device 600 operates as a standalone device or can be coupled (e.g., connected) to other machines.

The device 600 can comprise, but not be limited to, a server computer, a client computer, a personal computer (PC), a tablet computer, a laptop computer, a netbook, a PDA, or any machine capable of executing the instructions 610, sequentially or otherwise, that specify actions to be taken by device 600. Further, while only a single device 600 is illustrated, the term "machine" shall also be taken to include a collection of devices 600 that individually or jointly execute the instructions 610 to perform any one or more of the methodologies discussed herein.

The device 600 can include processors 604, memory/storage 606, and I/O components 602, which can be configured to communicate with each other such as via a bus 632. In an example embodiment, the processors 604 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) can include, for example, processor 608 and processor 612 that can execute the instructions 610. The term "processor" is intended to include multi-core processor that can comprise two or more independent processors (sometimes referred to as "cores") that can execute instructions 610 contemporaneously. Although FIG. 6 shows multiple processors 604, the device 600 can include a single processor with a single core, a single processor with multiple cores (e.g., a multi-core process), multiple processors with a single core, multiple processors with multiples cores, or any combination thereof.

The memory/storage 606 can include a main memory 614, static memory 616, or other memory storage, and a storage unit 618, both accessible to the processors 604 such as via the bus 632. The storage unit 618 and memory 614 store the instructions 610 embodying any one or more of the methodologies or functions described herein. The instructions 610 can also reside, completely or partially, within the memory 614, within the storage unit 618, within at least one of the processors 604 (e.g., within the processor's cache memory), or any suitable combination thereof, during execution thereof by the device 600. Accordingly, the memory 614, the storage unit 618, and the memory of processors 604 are examples of machine-readable media 620.

As used herein, "machine-readable medium" includes a machine-readable storage device 620 able to store instructions 610 and data temporarily or permanently and can include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 610. The term "machine-readable medium" shall also be taken to include any medium, or combination of multiple media, that is capable of storing instructions (e.g., instructions 610) for execution by a machine (e.g., device 600), such that the instructions, when executed by one or more processors of the device 600 (e.g., processors 604), cause the device 600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

One or more co-processors 642 and 644 can provide a wide variety of bit-level processing to provide data to a processor (e.g., processor 604). The particular operations of each of the one or more co-processors is configurable. In some embodiments, device 600 includes N number of co-processors coupled to the components within device 600 via bus 632.

The input/output (I/O) components 602 can include a wide variety of components to receive input, provide output, produce output, transmit information, exchange information, capture measurements, and so on. The specific I/O components 602 that are included in a particular machine will depend on the type of machine. For example, portable machines such as mobile phones will likely include a touch input device or other such input mechanisms, while a headless server machine will likely not include such a touch input device. It will be appreciated that the I/O components 602 can include many other components that are not shown in FIG. 6. The I/O components 602 are grouped according to functionality merely for simplifying the following discussion and the grouping is in no way limiting. In various example embodiments, the I/O components 602 can include output components 626 and input components 628. The output components 626 can include audio/visual components 634 (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 628 can include audio visual devices 636 having alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

Communication can be implemented using a wide variety of technologies. The I/O components 602 can include communication components 630 operable to couple the device 600 to a network 622 or devices 624 via coupling 638 and coupling 640, respectively. For example, the communication components 630 can include a network interface component or other suitable device to interface with the network 622. In further examples, communication components 630 can include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 624 can be another machine or any of a wide variety of peripheral devices (e.g., a peripheral device coupled via a USB).

Moreover, the communication components 630 can detect identifiers or include components operable to detect identifiers. For example, the communication components 630 can include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF416, Ultra Code, UCC RSS-2D bar code, and other optical codes), or acoustic detection components (e.g., microphones to identify tagged audio signals). In addition, a variety of information can be derived via the communication components 630, such as location via Internet Protocol (IP) geo-location, location via Wi-Fi® signal triangulation, location via detecting an NFC beacon signal that can indicate a particular location, and so forth.

The instructions 610 can be transmitted or received over the network 622 using a transmission medium via a network interface device (e.g., a network interface component included in the communication components 630) and utilizing any one of a number of well-known transfer protocols (e.g., hypertext transfer protocol (HTTP)). Similarly, the instructions 610 can be transmitted or received using a transmission medium via the coupling 640 (e.g., a peer-to-peer coupling) to devices 624. The term "transmission medium" shall be taken to include any intangible medium that is capable of storing, encoding, or carrying instructions 610 for execution by the device 600, and includes digital or analog communications signals or other intangible medium to facilitate communication of such software.

Figure 7:
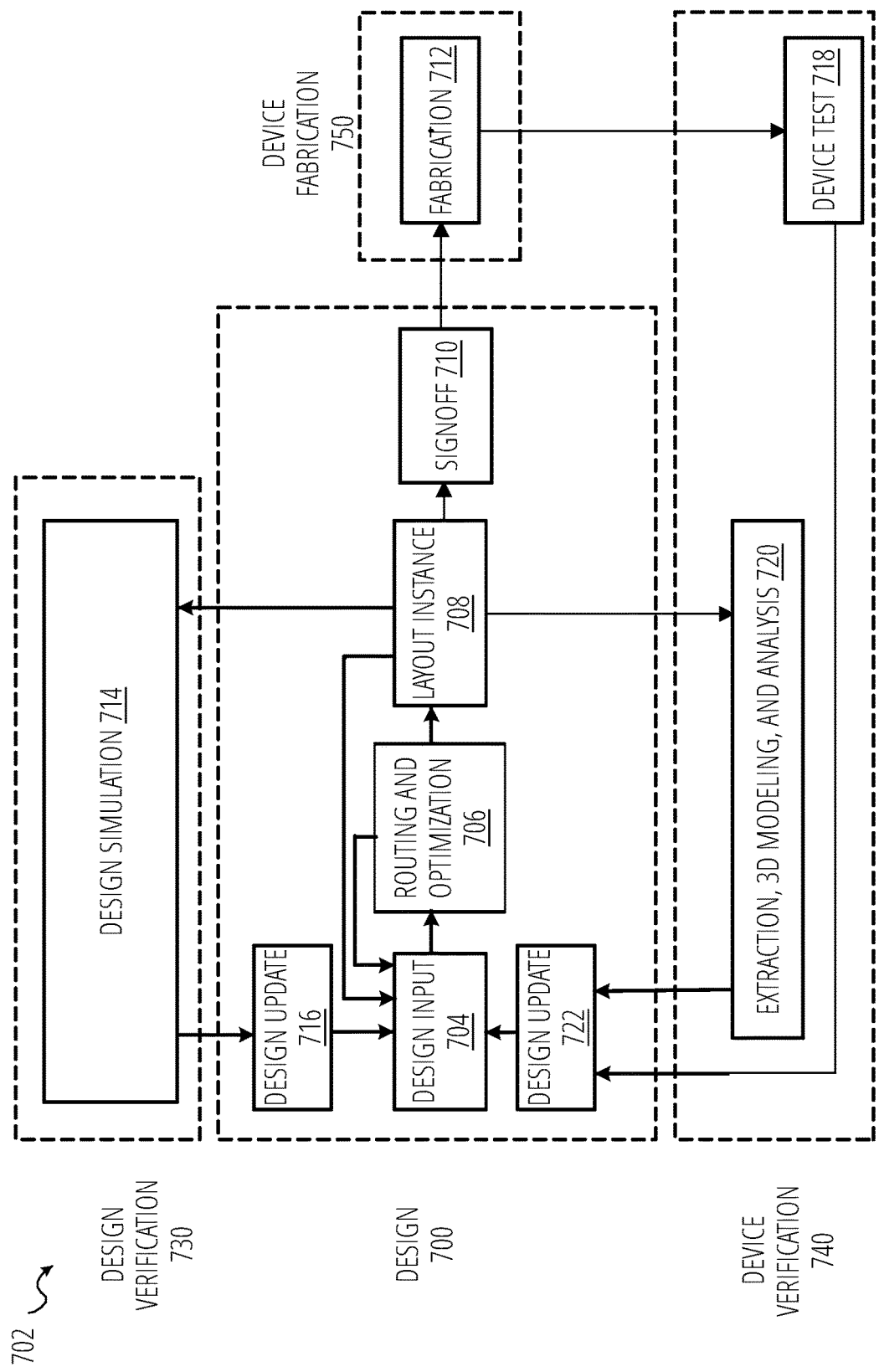
FIG. 7 is a diagram illustrating an example design process flow for coordinating bit-level processing of data in accordance with some embodiments.

FIG. 7 is a diagram illustrating an example design process flow 702, according to some embodiments. As shown, the design process flow 702 includes a design phase 700, a device fabrication phase 750, a design verification phase 730, and a device verification phase 740. The design phase 700 involves an initial design input 704 operation where the basic elements and functionality of a device are determined, as well as revisions based on various analyses and optimization of a circuit design. This design input 704 operation is where block instances are used in the circuit design and any additional circuitry for the design around the blocks is selected. The initial strategy, tactics, and context for the device to be created are also generated in the design input 704 operation, depending on the particular design algorithm to be used.

In some embodiments, following an initial selection of design values in the design input 704 operation, routing, timing analysis, and optimization are performed in a routing and optimization 706 operation, along with any other automated design processes. While the design process flow 702 shows routing and optimization 706 occurring prior to a layout instance 708, routing, timing analysis, and optimization 706 can be performed at any time to verify operation of a circuit design. For instance, in various embodiments, timing analysis in a circuit design can be performed prior to routing of connections in the circuit design, after routing, during register transfer level (RTL) operations, or as part of a signoff 710, as described below.

After design inputs are used in the design input 704 operation to generate a circuit layout, and any of the routing and optimization 706 operations are performed, a layout is generated in the layout instance 708. The layout describes the physical layout dimensions of the device that match the design inputs. Prior to this layout being provided to a fabrication 712 operation, the signoff 710 is performed on the circuit design defined by the layout.

After signoff verification by the signoff 710, a verified version of the layout is used in the fabrication 712 operation to generate a device, or additional testing and design updates can be performed using designer inputs or automated updates based on design simulation 714 operations or extraction, 3D modeling, and analysis 720 operations. Once the device is generated, the device can be tested as part of device test 718 operations, and layout modifications generated based on actual device performance.

A design update 716 from the design simulation 714; a design update 722 from the device test 718 or the extraction, 3D modeling, and analysis 720 operations; or the design input 704 operation can occur after the initial layout instance 708 is generated. In various embodiments, whenever design inputs are used to update or change an aspect of a circuit design, a timing analysis and the routing and optimization 706 operation can be performed.

What is claimed is:

1. A receiver device comprising:
   a processor;
   a non-linear equalizer; and
   a plurality of co-processors, each of the plurality of co-processors including an accumulator and operably coupled to the processor, the non-linear equalizer, and the accumulator;
   wherein at least one of the plurality of co-processors is configured to perform operations comprising:
     receiving a set of configuration values from the processor;
     receiving a data stream for processing from the non-linear equalizer that is separate from the plurality of co-processors, the data stream including an error signal and a data signal;
     processing the data stream based on the set of configuration values, the processing including performing bit-level processing of the data stream to generate a processed data stream;
     accumulating processed data from the processed data stream, the processed data including a comparison value between the error signal and the data signal; and providing at least a portion of the processed data stream to the processor.

2. The receiver device of claim 1, wherein the at least one of the plurality of co-processors is further configured to perform operations comprising:
receiving, from the non-linear equalizer, the error signal;
accumulating the comparison value calculated between the error signal and the data signal;
storing the accumulated comparison value in the accumulator; and
providing the accumulated comparison value to the processor.

3. The receiver device of claim 1, wherein the at least one of the plurality of co-processors is further configured to perform operations comprising:
accumulating a number of bits received in the data stream; and
storing the number of bits in the accumulator.

4. The receiver device of claim 1, wherein the at least one of the plurality of co-processors is further configured to perform operations comprising:
selecting at least a portion of data of the data stream to be accumulated based upon a level of a current data bit of the data stream.

5. The receiver device of claim 1 wherein the at least one of the plurality of co-processors is further configured to perform operations comprising:
selecting at least a portion of data of the data stream to be accumulated based upon a difference between levels of a current data bit and a subsequent data bit of the data stream.

6. The receiver device of claim 1, wherein the at least one of the plurality of co-processors is further configured to perform operations comprising:
processing a first portion of data of the data stream through a programmable filter to generate filtered data;
selecting a second portion of data to be accumulated based upon the filtered data; and
accumulating correlation data computed based upon the filtered data.

7. The receiver device of claim 1, wherein the at least one of the plurality of co-processors is further configured to perform operations comprising:
accumulating data from the data stream in the accumulator;
filtering the accumulated data to obtain a positive overflow signal and a negative overflow signal; and
providing the positive overflow signal and the negative overflow signal to the processor.

8. The receiver device of claim 1, wherein the at least one of the plurality of co-processors is further configured to perform operations comprising:
automatically ceasing accumulating data from the data stream in the accumulator in accordance with a generation of an output signal;
sending the output signal to the processor;
receiving an input signal from the processor; and
resuming accumulating data from the data stream based on the input signal.

9. The receiver device of claim 1, further comprising a timer, wherein the processor is configured to perform the operations comprising:
sending a timing signal from the timer to a first co-processor and a second co-processor of the plurality of co-processors; and
causing the first co-processor and the second co-processor of the plurality of co-processors to either begin or end accumulating data at a same time.

10. The receiver device of claim 1, wherein the at least one of the plurality of co-processors is further configured to perform operations comprising:
sending an output signal to the processor;
ceasing processing of the data stream; and
resetting the accumulator.

11. A method, comprising:
receiving, at a first co-processor of a plurality of co-processors, a set of configuration values from a processor;
receiving, from a non-linear equalizer that is separate from the plurality of co-processors, a data stream for processing, the data stream including an error signal and a data signal;
processing the data stream based upon the set of configuration values, the processing including performing bit-level processing of the data stream;
accumulating, at an accumulator of the first co-processor, processed data from the processed data stream, the processed data including a comparison value between the error signal and the data signal; and
providing at least a portion of the processed received data stream to the processor.

12. The method of claim 11, wherein the first co-processor performs further operations comprising:
receiving, from the non-linear equalizer, the error signal;
accumulating the comparison value calculated between the error signal and the data signal;
storing the accumulated comparison value in the accumulator operably coupled to the first co-processor; and
providing the accumulated comparison value to the processor.

13. The method of claim 12, wherein the first co-processor performs further operations comprising:
accumulating a number of bits received in the data stream; and
storing the number of bits in the accumulator.

14. The method of claim 12, wherein the first co-processor performs further operations comprising:
accumulating data from the data stream in the accumulator;
filtering the accumulated data to obtain a positive overflow signal and a negative overflow signal; and
providing the positive overflow signal and the negative overflow signal to the processor.

15. The method of claim 12, wherein the first co-processor performs further operations comprising:
automatically ceasing accumulating data from the data stream in the accumulator in accordance with a generation of an output signal;
sending the output signal to the processor;
receiving an input signal from the processor; and
resuming accumulating data from the data stream based on the input signal.

16. The method of claim 12, wherein the first co-processor performs further operations comprising:
sending a timing signal from a timer to the first co-processor and a second co-processor distinct from the first co-processor and the processor; and
causing the first and second co-processors to either begin or end accumulating data simultaneously.

17. The method of claim 11, wherein the first co-processor performs further operations comprising:

selecting at least a portion of data of the data stream to be accumulated based upon a level of a current data bit of the data stream.

18. The method of claim 11, wherein the first co-processor performs further operations comprising:
    selecting at least a portion of data of the data stream to be accumulated based upon a difference between levels of a current data bit and a subsequent data bit of the data stream.

19. The method of claim 11, wherein the first co-processor performs further operations comprising:
    processing a first portion of data of the data stream through a programmable filter to generate filtered data;
    selecting a second portion of data to be accumulated based upon the filtered data; and
    accumulating correlation data computed based upon the filtered data.

20. A non-transitory computer-readable storage medium storing one or more programs, the one or more programs comprising instructions which, when executed by one or more processors of an electronic device, cause the electronic device to perform one or more operations comprising:
    receiving, from a processor, a set of configuration values;
    receiving, from a non-linear equalizer, a data stream for processing, the data stream including an error signal and a data signal;
    processing, using at least one of two or more co-processors that is separate from the non-linear equalizer, the data stream based upon the set of configuration values, the processing including performing bit-level processing of the data stream to generate a processed data stream;
    accumulating, using the at least one of two or more co-processors, processed data from the processed data stream, the processed data including a comparison value between the error signal and the data signal; and
    providing at least a portion of the processed data stream to the processor.

* * * * *